United States Patent [19]

Kreuer et al.

[11] 4,444,508
[45] Apr. 24, 1984

[54] PROCESS FOR MIXING PULVERULENT ADDITIVES INTO A LIQUID REACTION COMPONENT

[75] Inventors: Karl D. Kreuer, Leverkusen; Lothar Klier, Leichlingen, both of Fed. Rep. of Germany

[73] Assignee: Bayer Aktiengesellschaft, Leverkusen, Fed. Rep. of Germany

[21] Appl. No.: 390,565

[22] Filed: Jun. 21, 1982

[30] Foreign Application Priority Data

Jul. 10, 1981 [DE] Fed. Rep. of Germany ....... 3127218

[51] Int. Cl.³ .................... B01F 13/06; B01F 15/02
[52] U.S. Cl. .................................... 366/139; 366/163
[58] Field of Search ............... 366/139, 163, 165, 177, 366/179, 182, 183, 192, 194, 247, 604; 422/225, 232, 269

[56] References Cited

U.S. PATENT DOCUMENTS

| | | | |
|---|---|---|---|
| 3,885,587 | 5/1975 | Troope | 366/177 |
| 3,969,314 | 7/1976 | Grigull | 260/42 |
| 4,175,873 | 11/1979 | Iwako et al. | 366/165 |

FOREIGN PATENT DOCUMENTS

| | | |
|---|---|---|
| 2026337 | 12/1971 | Fed. Rep. of Germany ...... 366/179 |
| 2445287 | 4/1976 | Fed. Rep. of Germany . |
| 56-76474 | 6/1981 | Japan . |
| 1395571 | 5/1975 | United Kingdom . |

*Primary Examiner*—Robert W. Jenkins
*Assistant Examiner*—Arthur D. Dahlberg
*Attorney, Agent, or Firm*—Gene Harsh; Joseph C. Gil

[57] ABSTRACT

This invention is directed to a process and apparatus for mixing a pulverulent or small particle size additive into at least one of the liquid reaction components for the preparation of a reaction mixture which forms a solid substance or a foam, wherein the reaction components are introduced into separate chambers and subjected to turbulence by stirring and the pulverulent additive is stirred into at least one of the reaction components and that liquid reaction component charged with the additive is transferred into a second reaction component and mixed therewith. The liquid reaction component to which the pulverulent additive is to be introduced is charged into a closed chamber to a predetermined fill level, the chamber is sealed off and a vacuum is applied above the fill level, then the additive is introduced into the chamber below the liquid level by means of the vacuum and is uniformly distributed within the liquid reaction component by the turbulence produced by stirring, while the reaction component and the additive are freed from the air carried with them by the degassing effect of the vacuum.

3 Claims, 3 Drawing Figures

PROCESS FOR MIXING PULVERULENT ADDITIVES INTO A LIQUID REACTION COMPONENT

This invention relates to a process for mixing pulverulent or small particle size additives into at least one of the liquid reaction components for the preparation of a reaction mixture which forms a solid substance or foam. The liquid reaction component to which the pulverulent material is to be added is introduced into a chamber and subjected to turbulence by stirring; the additive is stirred into the component; and the resulting liquid component is then mixed with a second reaction component in a separate chamber.

BACKGROUND OF THE INVENTION

Solid substances or foams are often required to have special quality or strength properties. Additives are introduced into the reaction mixtures from which these materials are to be formed in order to improve the properties or lower the cost of these materials. In the first case, the additives are pulverulent, fibrous, platelet or granular reinforcing substances, such as, in particular, glass fibers, mica or barium sulfate. In the second case, the substances are fillers which are inferior in quality and less expensive than the reaction components, such as chalk powder, sawdust or ground foam waste.

Various proposals have been made for constructing the apparatus in order that the additives may be directly introduced into the reaction mixture or mixed with one of the reactants. Unfortunately, the manner in which these additives are introduced in the prior proposals has created inaccurate additive dosages and has allowed air to be introduced into the component with the additive, the air having a deleterious effect on the quality of the end product.

In order to ensure exact ratios of additive to component, the practitioner has been forced to first mix the additives with at least one of the reaction components in a stirrer vessel and operate batchwise. This method, however, produces a considerable amount of dust which is inconvenient for the operators and, in some cases, even substantially falsifies the proportions of the doses. There is a further difficulty with particular reinforcing additives, such as short fibers, in that when these particular substances are further size-reduced during the mixing process, their reinforcing properties are changed and the apparatus is subjected to greater wear. Under all these conditions, it is presumed that the additives should be homogeneously distributed in the reaction components within as short a stirring time as possible.

It is an object of the present invention to provide a process with which pulverulent and other small-particled additives may be added in the exact proportions to at least one of the reaction components without loss and without producing dust. A further object is to provide a process to mix pulverulent additives within a short time into a reaction component which may then be degassed.

DESCRIPTION OF THE INVENTION

Figure 1:
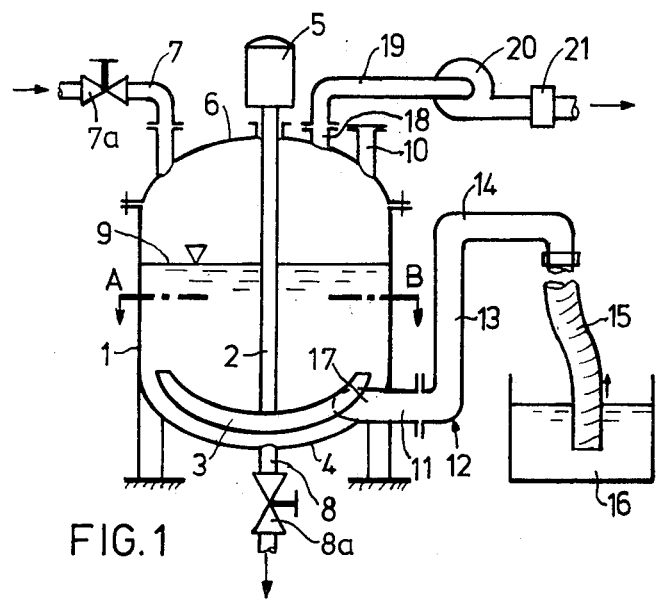
FIG. 1 shows the side view of the apparatus.

It has now been discovered that these objectives may be accomplished according to a six-step procedure. The procedure involves introducing a liquid reaction component into a special chamber to a predetermined level, sealing the chamber and applying a vacuum above the surface of the liquid component. The additive is introduced into the chamber below the surface of the liquid component by means of the vacuum and is uniformly distributed in the liquid reaction component by the turbulence produced by stirring. The reaction component and additive are concurrently freed from any entrapped air in the mixture by means of the vacuum with this degassing of the reaction component and additive preferably continuing after the introduction of the additive has been completed and the additive entry point has been sealed off.

By this procedure, both the component and the additive may be introduced into the container in measured quantities. Also, if at a given initial viscosity of the component, the speed of rotation, the level of filling and the suction pressure are empirically determined such that the additive will not be pulled through the liquid column, no dust develops when the additive is introduced due to the wetting which takes place with subsurface addition.

It is also possible, according to one variant of the process according to the method of the present invention, to introduce the reaction components into the chamber by the vacuum, thereby eliminating any requirement for pumps with this process.

The apparatus for carrying out the process acording to the invention comprises a sealed container with stirring means arranged therein and an inlet and outlet for a liquid reaction component or a liquid reaction component charged with an additive. The novelty of this apparatus consists in that the container also has a suction pipe above the fill level (this suction pipe being connected by a draw-off pipe to a source of vacuum) and a delivery pipe for the introduction of an additive below the fill level.

The apparatus itself is easily produced since containers, which may be mass produced, need only be equipped with the appropriate connections. If the suction end of the supply pipe for the additive is formed as a flexible tube, such as those used, for example, in domestic vacuum cleaners, the additive may, if required, be directly sucked out of the container in which it is supplied by inserting the end of the tube into the package so that no additional storage vessels are required. The source of vacuum used may be, for example, a suction blower of suitable power.

Of course, before the introduction of the reaction component and application of the vacuum, the supply pipe for the additive must be secured to prevent outflow of reaction component through this pipe. This may be accomplished by arranging a shut-off valve in the additive supply pipe or by raising the additive supply pipe above the height of the filling level outside the container itself.

The additive supply pipe preferably opens in the range of sweep of the stirrer, allowing the stirrer arms to sweep over the opening, immediately catching hold of the entering additive and distributing the additive in both the direction of the rotation and radially. Additionally, any larger air bubbles which might form are broken down before such bubbles can rise to the liquid surface and burst, causing the pulverulent additive entrained within the bubble released to be as dust. Under normal operating conditions, with the various operating parameters correctly adjusted, such bubbles are broken down to so small a size that the additive contained in them is wetted by the reaction component and thus bound so that the air bubbles burst on the surface without causing dust.

According to a particular embodiment, the additive supply pipe opens tangentially into the container in the direction of rotation of the stirrer, thus further facilitating the drawing in of additive and the distribution of the additive into the reaction component.

The new apparatus according to the invention is represented purely schematically in an exemplary embodiment shown in a drawing and is described in more detail below.

Figure 2:
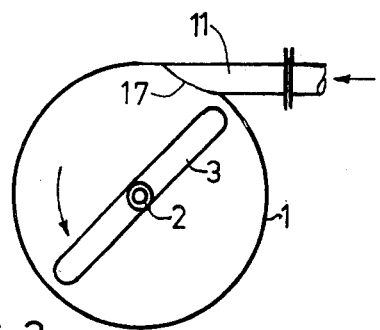
FIG. 2 shows a section through the apparatus along the line A/B of FIG. 1.

In FIGS. 1 and 2 of the drawings, the apparatus comprises a container 1 in which is arranged a stirrer 2 whose stirrer arms 3 sweep over the bottom 4 of the container. The drive 5 of the stirrer is mounted on the container cover 6. An inlet 7 containing a shut-off valve 7a opens through the container cover 6, while the outlet 8 for the mixture of reaction component and filler, which also contains a shut-off valve 8a, is situated at a bottom of the container 4. An inspection window 10 is also arranged on the container cover 6. Below the fill level 9, an additive supply connection 11 which forms part of an additive supply pipe 12 opens tangentially into the container 1. This supply pipe further comprises a rigid pipe section 13 which has a bend 14 raised above the height of the fill level 9. The end of the filler supply pipe 12 is in the form of a flexible suction tube and extends into a reserve vessel 16 containing the short glass fibers as reinforcing material. The mouth 17 of the additive supply pipe 11 is arranged in the region swept by the stirrer arms 3 of the stirrer 2. A suction connection 18 arranged on the container cover 6 and thus above the filling level 9 is connected through a suction pipe 19 to a vacuum source 20 in the form of a suction blower. The vacuum source 20 has an air filter 21 at the outlet end. The outflow 8 is connected with a mixing apparatus (not shown) in which the reaction component charged with additive is mixed with at least one further reaction component.

Figure 3:
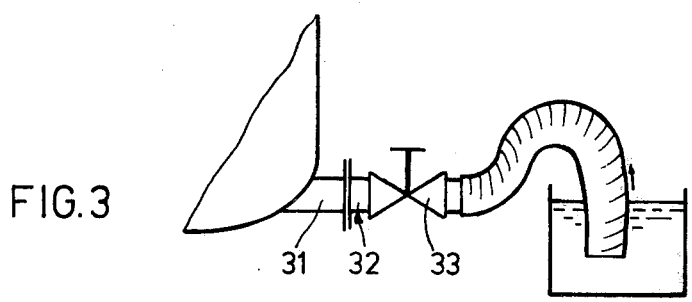
FIG. 3 is a sketch of the apparatus with an alternative form of additive supply pipe.

In FIG. 3 the additive supply connecting piece 31 of the additive supply pipe 32 has a shut-off valve 33.

EXAMPLE

The apparatus according to FIG. 1, modified by FIG. 3 was used. The container 1 had a volume of 200 l a diameter of 0.6 m and a height of 1.0 m. Polyether polyol of the OH-number 28 obtained by propoxilation of trimethylol propane with subsequent ethoxilation of the propoxilation product, the weight ratio of propylene oxide to ethylene oxide being 83:17, was introduced as the reaction component through the inlet 7 until a fill level of 0.55 m was reached. The initial viscosity of the polyether polyol was 1200 mPas. The stirrer mechanism 2 consisting of an anchor stirrer was then set into rotation at 100 revs/min, the shut-off valve 33 was opened and the suction blower 20 was switched on. At a suction rate of 6000 l/min, a vacuum of 200 mbar was produced. By means of the applied vacuum, 75 kg of short glass fibers were sucked into the liquid column through the additive supply pipe 12 and mixed in said column by the stirrer 2. Both the suction pipe 19 and the additive supply pipe 32 had an internal diameter of 50 mm. The shut-off valve 33 in the pipe 32 restricted the diameter of throughflow to 25 mm. The time taken for the additive to be introduced was approximately 5 minutes. The shut-off valve 33 was then closed. After about 30 minutes stirring time, the glass fibers were homogeneously mixed with the polyether polyol and the mixture was sufficiently degassed.

What is claimed is:

1. A process for mixing a pulverulent additive into one of the liquid reaction components for the preparaion of a reaction mixture which forms a solid substance or a foam, wherein the reaction components are introduced into separate chambers and subjected to turbulence by stirring and the pulverulent additive is stirred into at least one of the reaction components and that liquid reaction component charged with the additive is transferred to a second reaction component and mixed therewith, characterized in that the liquid reaction component to which the pulverulent additive is to be introduced is charged into a closed chamber to a predetermined fill level, the chamber is sealed off and a vacuum is applied above the fill level, then the additive is introduced into the chamber below the liquid level by means of the vacuum and is uniformly distributed within the liquid reaction component by the turbulence produced by stirring, while the reaction component and the additive are freed from the air carried with them by the degassing effect of the vacuum.

2. The process according to claim 1, characterized in that degassing of the reaction component and of the additive is continued after introduction of the additive has been terminated.

3. The process according to claim 1, characterized in that the reaction component is also introduced by vacuum into the chamber.

* * * * *